US006182325B1

(12) United States Patent
Herman

(10) Patent No.: US 6,182,325 B1
(45) Date of Patent: Feb. 6, 2001

(54) CHAMBER CLEANING MECHANISM

(75) Inventor: Timothy L. Herman, Napa, CA (US)

(73) Assignee: Advanced Technology Materials, Inc., Danbury, CT (US)

( * ) Notice: Under 35 U.S.C. 154(b), the term of this patent shall be extended for 0 days.

(21) Appl. No.: 09/041,054

(22) Filed: Mar. 10, 1998

(51) Int. Cl.$^7$ .................. B08B 9/027; F23J 3/02
(52) U.S. Cl. .............. 15/246.5; 15/249.2; 15/104.068; 55/295
(58) Field of Search ............... 15/246.5, 249.1, 15/249.2, 104.68, 236.01, 104.09, 104.096, 104.11, 104.068; 422/210; 55/295

(56) References Cited

U.S. PATENT DOCUMENTS

| | | | | |
|---|---|---|---|---|
| 548,138 | * | 10/1895 | Prather | 15/246.5 |
| 851,134 | * | 4/1907 | Kleidon | 15/249.2 |
| 1,261,243 | * | 4/1918 | Kettner | 15/246.5 |
| 1,616,777 | * | 2/1927 | Booth | 15/246.5 |
| 2,554,546 | * | 5/1951 | Zahm | 15/246.5 |
| 3,120,020 | * | 2/1964 | Schell | 15/249.2 |
| 3,589,609 | * | 6/1971 | Wyant | 15/249.2 |
| 4,210,976 | * | 7/1980 | Apelt et al. | 15/246.5 |

* cited by examiner

Primary Examiner—Robert J. Warden, Sr.
Assistant Examiner—Kaj K. Olsen
(74) Attorney, Agent, or Firm—Steven J. Hultquist; William A. Barrett; Oliver A. M. Zitzmann

(57) ABSTRACT

An apparatus for cleaning a chamber is disclosed. Scraping blades are rotatably mounted within a chamber and parallel to a longitudinal axis of the chamber. The scraping blades are rotated circumferentially within the chamber, scraping the inner surface of the chamber to prevent the buildup of particulate matter. An annular gear assembly provides mounting support for the scraping blades. A pneumatically operated pushrod assembly rotates the scraping blades circumferentially within the chamber. The annular gear assembly and pushrod assembly do not obstruct a direct path through the chamber.

15 Claims, 4 Drawing Sheets

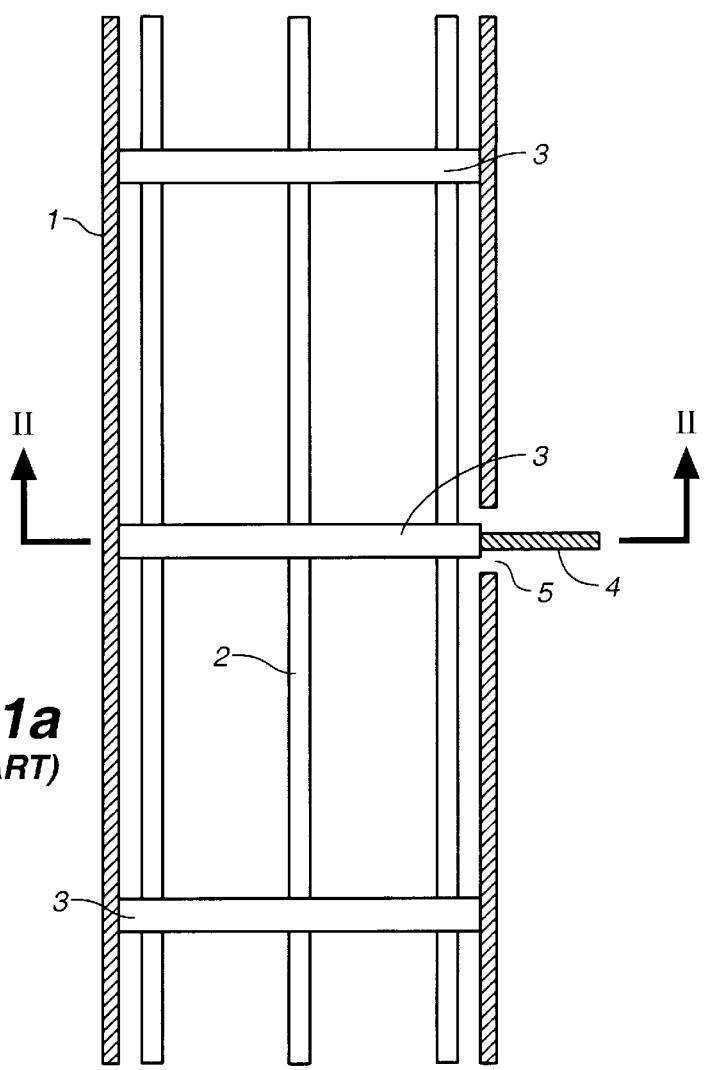
FIG._1a
*(PRIOR ART)*
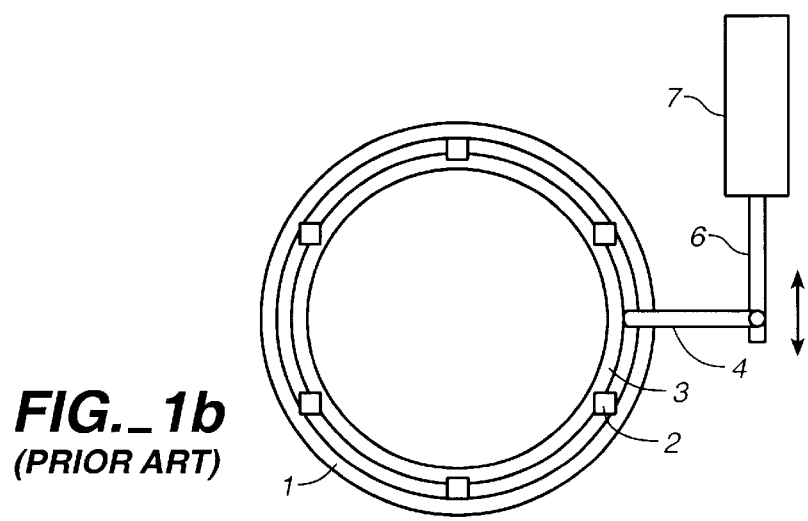
FIG._1b
*(PRIOR ART)*

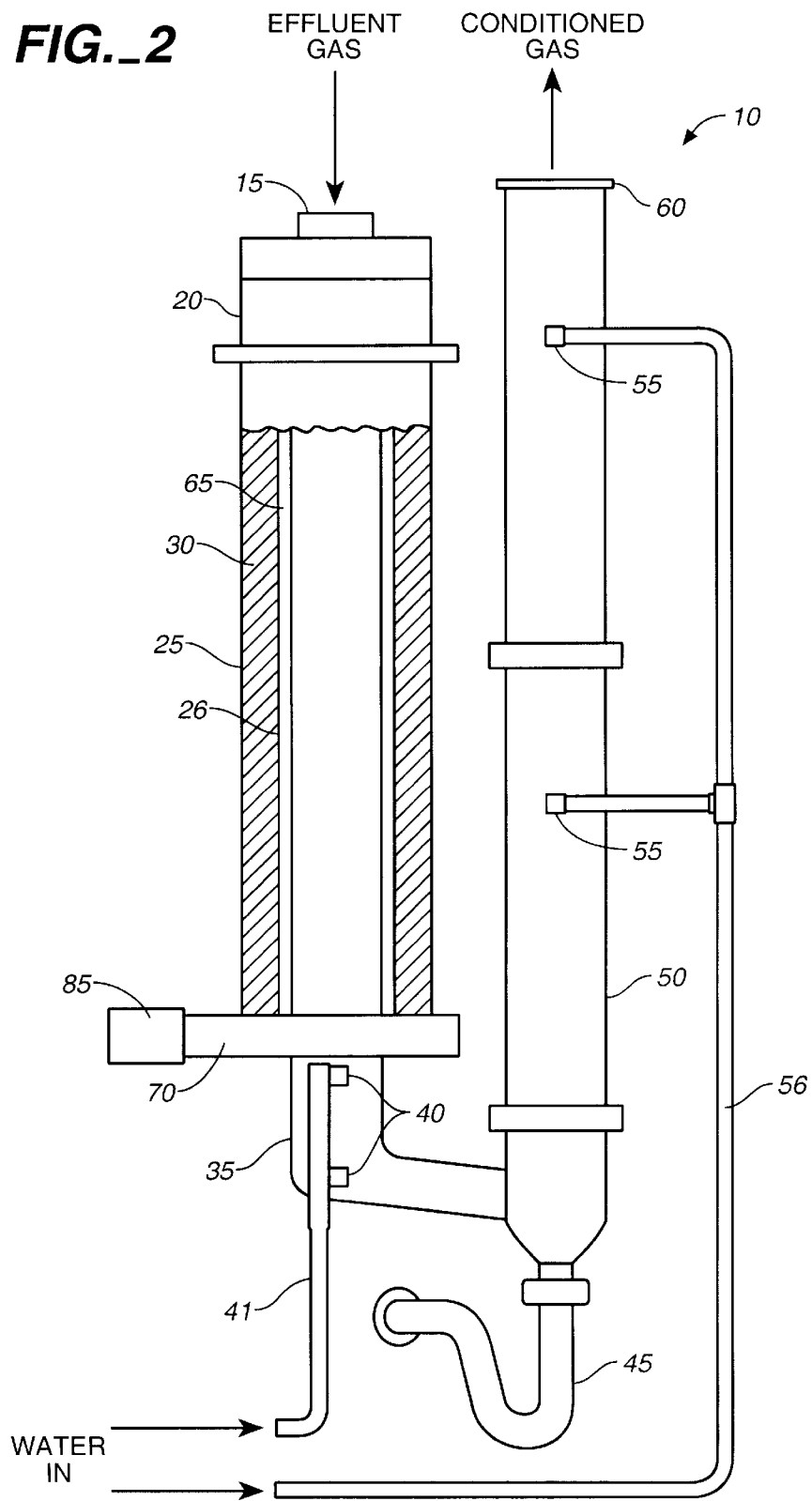
FIG._2

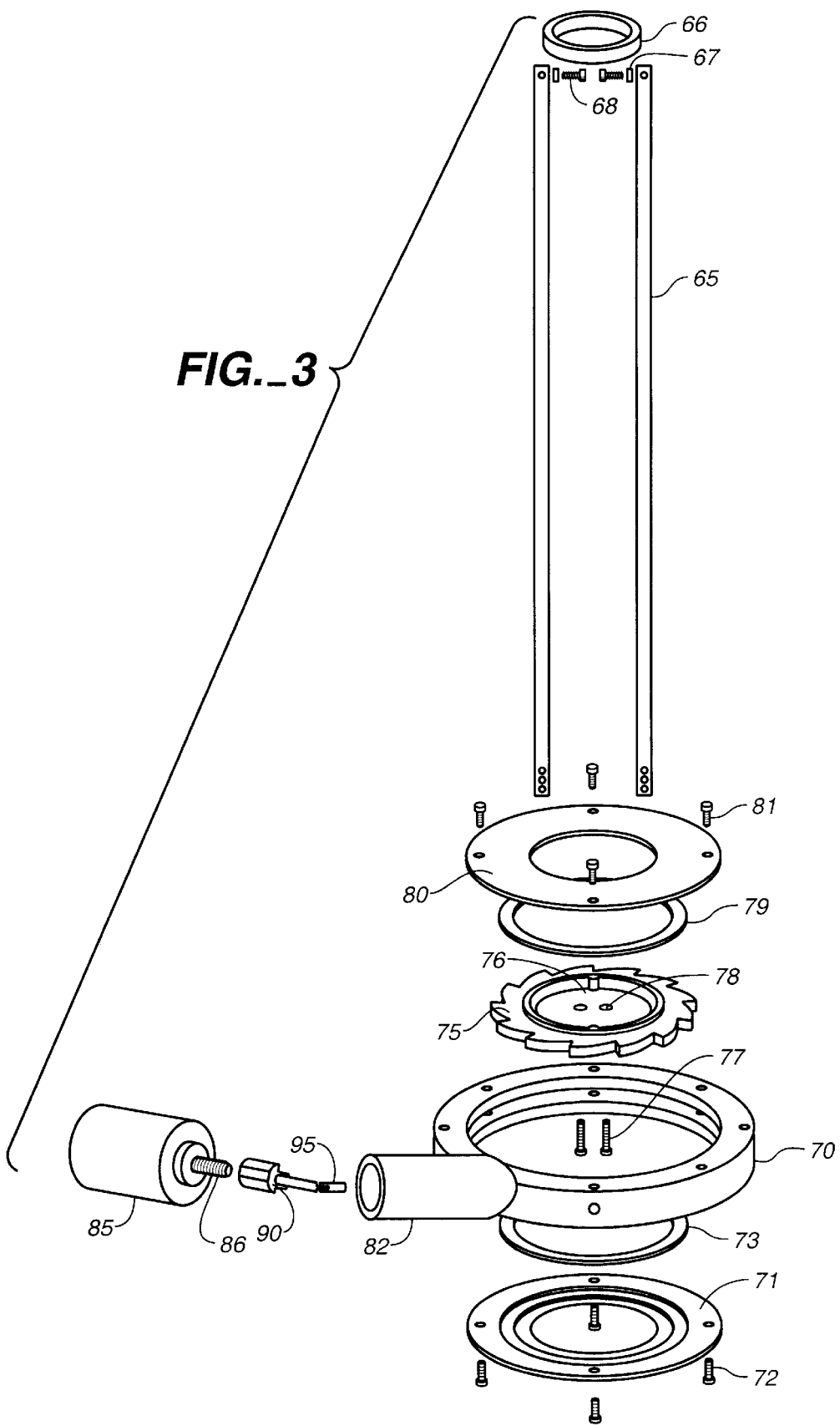

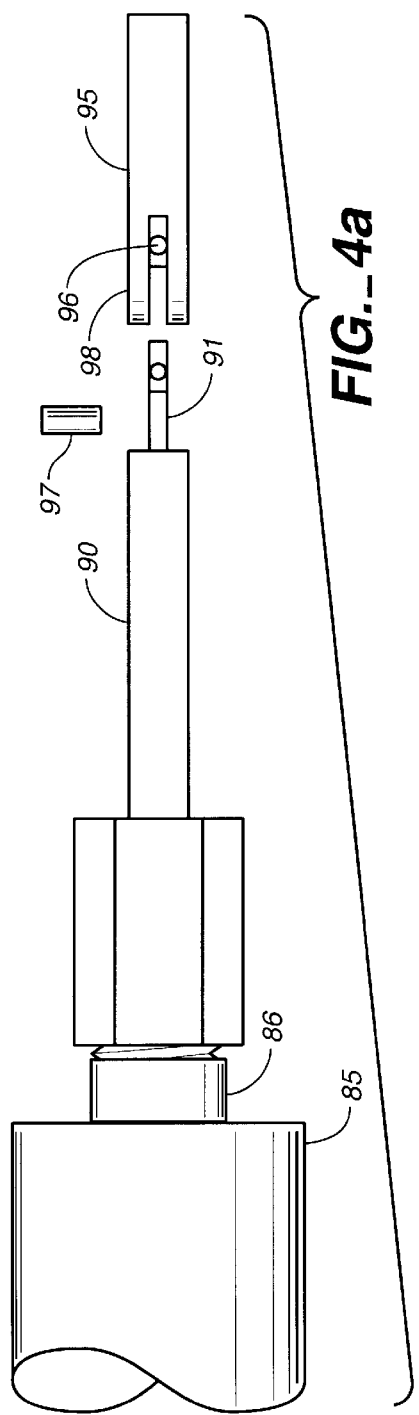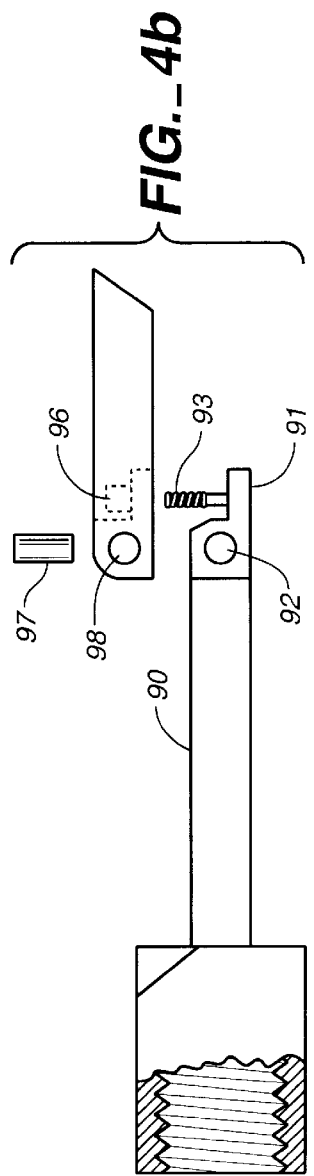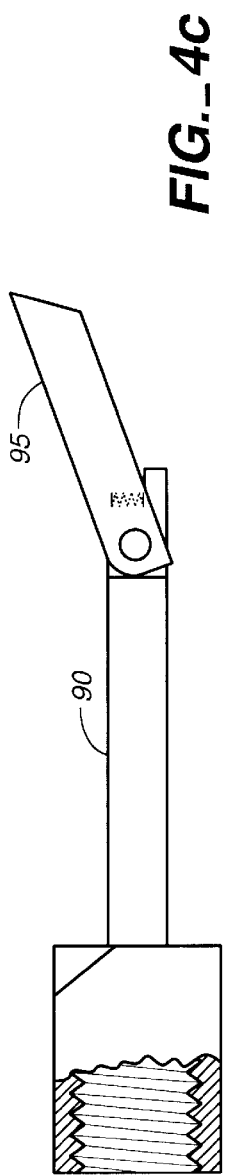

CHAMBER CLEANING MECHANISM

BACKGROUND OF THE INVENTION

The invention relates to a method and apparatus for cleaning a chamber.

The manufacturing or fabrication processes in certain industries produce toxic gaseous effluent. For example, chemical vapor deposition processes associated with semiconductor fabrication produces highly toxic gaseous effluent. Also, combustion processes involving the partial combustion of solid fuels discharge hot gaseous effluent. These gaseous effluent are usually heavily laden with particulate matter and must be cleaned or "scrubbed" before they can be treated and released into the environment. Typically, particulate laden gaseous effluent are introduced into a scrubbing chamber through an inlet. The particulate matter tends to adhere to the inner surface of the chamber. Various methods and apparatus have been devised to prevent, or at least slow down, the buildup of particulate matter on the inner surfaces of scrubbing chambers.

Referring to prior art FIG. 1a, a chamber cleaning mechanism is shown. The scrubbing chamber (not shown) has an inlet 1, which houses a plurality of scraping blades 2 parallel to a longitudinal axis of inlet 1. The scraping blades 2 are rigidly interconnected by three rings 3, as shown. An actuating arm 4 extends through a slit 5 in the inlet 1 and is attached to the middle one of rings 3.

Referring now to prior art FIG. 1b, actuating arm 4 is attached to a piston rod 6, which is driven by a pneumatically operated piston 7. The pneumatically operated piston 7 drives actuating arm 4 back and forth, causing the scraping blades 2 to scrape in a reciprocating motion along the inner surface of inlet 1.

SUMMARY OF THE INVENTION

In one embodiment, the invention relates to a method for cleaning a chamber having at least one scraping blade mounted to an annular member. The method comprises the step of applying a force to the annular member in a direction tangential to a circumference of the annular member so as to cause the annular member to circumferentially rotate, thereby causing the scraping blade to circumferentially rotate, whereby an inner surface of the chamber is scraped by the scraping blade.

In another embodiment, the invention relates to a chamber cleaning mechanism comprising an annular mounting means for mounting at least one scraping blade within the chamber parallel to a longitudinal axis of the chamber, and a rotating means for rotating the scraping blade circumferentially within the chamber.

In another embodiment, the invention relates to a chamber cleaning mechanism comprising at least one scraping blade rotatably mounted within the chamber parallel to a longitudinal axis of the chamber. An annular gear assembly supports the scraping blade within the chamber, and a pushrod assembly rotates the scraping blade circumferentially within the chamber.

Advantages and features of the invention include one or more of the following: rotatably mounted scraping blades for cleaning the inner surface of a chamber, and a method and apparatus for mounting and rotating the scraping blades circumferentially in such a way as to allow a direct and unobstructed path through the chamber. Other advantages and features of the invention will become apparent from the following description.

BRIEF DESCRIPTION OF THE DRAWINGS

FIG. 1a illustrates a prior art chamber cleaning mechanism.

FIG. 1b illustrates a view along line II—II of the chamber cleaning mechanism in FIG. 1a.

FIG. 2 illustrates a gaseous effluent scrubbing chamber and an apparatus for cleaning the chamber.

FIG. 3 illustrates scraping blades and a gear assembly for mounting the scraping blades according to the embodiment of FIG. 2.

FIG. 4a illustrates a side view of a pushrod assembly for rotating the scraping blades according to the embodiment of FIG. 2.

FIG. 4b illustrates a top view of the pushrod assembly shown in FIG. 4a.

FIG. 4c illustrates a side view of the pushrod assembly shown in FIG. 4a after full assembly.

DESCRIPTION OF THE PREFERRED EMBODIMENTS

Referring now to FIG. 2, a gaseous effluent scrubbing chamber is shown generally at 10. The scrubbing chamber 10 has an inlet 15 for introducing gaseous effluent into scrubbing chamber 10. An oxygenator section 20 mixes the gaseous effluent with oxygen. A thermal reaction section 25 having an inner surface 26 and heating element 30 housed within thermal reaction section 25 decomposes and oxidizes the gaseous effluent. Gaseous effluent leaves thermal reaction chamber 25 through a direct and unobstructed distal opening in thermal reaction chamber 25 and enter a scrubbing section 35 wherein water sprays 40 spray water on the gaseous effluent. A first water intake 41 supplies water sprays 40 with water. A drain 45 carries away water from water spray 40 for treating and recycling. Gaseous effluent pass through scrubbing section 35 and up a cooling and scrubbing section 50 for cooling and further scrubbing. Water sprays 55 spray additional water on the gaseous effluent, providing further scrubbing. A second water intake 56 supplies water sprays 55 with water. The water is then carried away by drain 45. Gaseous effluent exits scrubbing chamber 10 through outlet 60. Scraping blades 65, which may be at least one scraping blade, scrape inner surface 26 of thermal reaction section circumferentially to prevent buildup of particulate matter. Scraping blades 65 are preferable thin and narrow so as to expose a minimum surface area of scraping blades 65 to the gaseous effluent.

Referring now to FIG. 3, an annular gear assembly for rotatably mounting scraping blades 65 is shown. Annular bracket 66, bolts 67, and washers 68 connect scraping blades 65 together to keep them stiff and spaced apart. The blades 65 may alternatively be welded to brackets 66. A distal annular flange plate 71 is fastened to an annular housing 70 at a bottom of annular housing 70 by bolts 72. Distal annular flange plate 71 supports a distal annular bearing 73 which is disposed on top of distal annular flange plate 71. Distal annular bearing 73 supports an annular gear 75 which is rotatably mounted on distal annular bearing 73. Annular gear 75 has tabs 76 which are adapted to receive scraping blades 65. Bolts 77 and washers 78 securely fasten scraping blades 65 to annular gear 75. A proximal annular bearing 79 is mounted on annular gear 75 to stabilize and support annular gear 75 during rotation. A proximal annular flange plate 80 is fastened to annular housing 70 by bolts 81 to cover and enclose the apparatus. Tubular extension 82 extends tangentially from housing 70 for housing a pushrod 90 and lever 95.

An advantage of annular gear assembly described above is that, in addition to supporting scraping blades 65, its annular shape allows a direct and unobstructed path for gaseous effluent to pass through thermal reaction section 25 and into scrubbing section 35.

Referring now to FIG. 4a, a pushrod assembly for rotating scraping blades 65 is shown. An air cylinder 85 pneumatically drives a piston 86. Pneumatically driven piston 86 is threaded to engage a pushrod 90 and to drive pushrod 90 back and forth in a reciprocating motion. Pushrod 90 has a pushrod tip 91 extending from a distal end which is adapted to receive a lever 95 for engaging annular gear 75.

Referring now to FIG. 4b, pushrod tip 91 has a hole 92 for receiving a lynch pin 97. Lever 95 likewise has a hole 98 at a proximal end for receiving lynch pin 97. Thus, by aligning pushrod hole 92 with lever hole 98 and inserting lynch pin 97 therethrough, pushrod 90 and lever 95 may be attached in a hinge of manner. Lever 95 also has a cavity 96 which is adapted to receive a spring 93 extending from pushrod tip 91.

As can be seen in FIG. 4c, spring 93 serves to bias lever 95 towards annular gear 75 such that lever 95 is always in contact with annular gear 75, thereby facilitating engagement of lever 95 to annular gear 75.

In operation, gaseous effluent, such as $AsH_3$, $CCl_4$, $C_2F_6$, $CF_4$, $GeH_4$, $H_2$, $PH_3$, $NF_3$, $SiH_4$, and TEOS, enters scrubbing chamber 10 through outlet 15. The gaseous effluent is not water soluble and will pass through water sprays essentially unreacted. The most effective way of disposing of the gaseous effluent is by burning by controlled thermal decomposition and oxidation. Thus, as gaseous effluent enters scrubbing chamber 10, it is mixed with an oxygen source, for example compressed air. This mixture of gaseous effluent and oxygen then enters thermal reaction section 25 wherein heating element 30 heats up the mixture and thermally decomposes and oxidizes it. The decomposed and oxidized mixture is then scrubbed in scrubbing section 35, cooled and further scrubbed in cooling/scrubbing section 50, and released through outlet 60. However, as the gaseous effluent is decomposed and oxidized in thermal reaction section 25, particulate matter formed in the gaseous effluent tends to cling and adhere to inner surface 26 of thermal reaction section 25.

To prevent buildup of particulate matter, scraping blades 65 are rotatably mounted parallel to a longitudinal axis of thermal reaction section 25 and scrape inner surface 26 of thermal reaction section 25 circumferentially. As described above, scraping blades 65 are securely fastened to annular gear 75, which is rotatably mounted and supported by distal and proximal annular bearings 73 and 79.

Annular gear 75 is rotated (thus rotating scraping blades 65) by the reciprocating motion of pushrod 90 and lever 95. Lever 95 is biased by spring 93 to engage a gear tooth of annular gear 75. Pneumatically driven piston 86 then drives pushrod 90 forward. The forward motion of pushrod 90 is transferred through lever 95 to the gear tooth of annular gear 75, pushing the gear tooth in a direction tangential to a circumference of annular gear 75, and causing annular gear 75 to rotate an angular distance equal to the distance traveled by the gear tooth.

As pneumatically driven piston 86 is pulled back, pushrod 90 and lever 95 are also pulled back, causing lever 95 to disengage from the current gear tooth of annular gear 75. When piston 86 subsequently drives forward, spring 93 causes lever 95 to engage the next gear tooth of annular gear 75. The gear tooth is then pushed in a direction tangential to the circumference of the annular gear 75 by the forward motion of pushrod 90, causing annular gear 75 to rotate again. The cycle is repeated with each back and forth motion of pneumatically operated piston 86 such that annular gear 75 is consequently circumferentially rotated, thereby causing scraping blades 65 to also circumferentially rotate.

An advantage of the invention is that the tangential pushing motion of the pushrod assembly, along with the annular shape of the gear assembly, allow for a direct and unobstructed path through thermal reaction section 25 and scrubbing section 35.

It is to be understood that the embodiment described above is merely illustrative of some of the many specific embodiments of the present invention, and that other arrangements can be devised by one of ordinary skill in the art at the time the invention was made without departing from the scope of the invention.

What is claimed is:

1. A self-cleaning chamber mechanism comprising:
   (a) a cylindrical chamber comprising:
      (i) a chamber wall comprising an interior surface, and
      (ii) at least one port positioned in a first end portion of the chamber and at least one port positioned in a second end portion of the chamber generally opposite to the first end portion of the chamber, wherein the ports are arranged to permit a longitudinal fluid flow path through said chamber;
   (b) at least one scraping blade rotatably mounted within the chamber parallel a longitudinal axis of said chamber;
   (c) a toothed annular gear assembly comprising an annular gear, said assembly supporting said scraping blade within said chamber; and
   (d) a push rod assembly adapted to engage the annular gear for rotating the scraping blade circumferentially around the interior of the chamber to scrape the interior surface of the chamber.

2. The self-cleaning chamber mechanism of claim 1, wherein said gear assembly comprises:
   (a) a distal annular flange plate fastened to an annular housing;
   (b) a distal annular bearing disposed within said annular housing on said distal annular flange plate;
   (c) an annular gear disposed within said annular housing on said distal annular bearing;
   (d) said at least one scraping blade coupled to said annular gear;
   (e) a proximal annular bearing disposed within said annular housing on said annular gear; and
   (f) a proximal annular flange plate fastened to said annular housing.

3. The self-cleaning chamber mechanism of claim 1, wherein said pushrod assembly comprises a lever biased towards said toothed annular gear such that a distal end of said lever is in contact with said toothed annular gear.

4. The self-cleaning chamber mechanism of claim 3, wherein said pushrod assembly further comprises:
   (a) a pushrod having a proximal pushrod end connected to a pneumatically operated piston, said piston driving said pushrod in a reciprocating motion; and
   (b) a pushrod tip extending from a distal pushrod end and adapted to hingedly engage a proximal end of said lever.

5. The self-cleaning chamber mechanism of claim 3, wherein said lever is springloaded.

6. A mechanism for cleaning an inner surface of a chamber, the mechanism comprising:
(a) a cylindrical chamber comprising:
(i) a chamber wall comprising an interior surface; and
(ii) at least one port positioned in a first end portion of the chamber and at least one port positioned in a second end portion of the chamber generally opposite to the first end portion of the chamber, wherein the ports are arranged to permit a longitudinal fluid flow path through said chamber;
(b) an annular housing comprising toothed annular gear rotatably mounted therein, the toothed annular gear comprising scraping members attached to a face thereof, and extending longitudinally through the cylindrical chamber, and contacting the interior chamber wall such that rotation of the toothed annular gear results in scraping of the interior chamber wall; and
(c) a gear-rotating mechanism for tangentially rotating the toothed annular gear;
wherein the self-cleaning chamber mechanism allows a longitudinal flow path for gases through the chamber.

7. The mechanism of claim 6, wherein the gear-rotating mechanism comprises:
(a) a push rod comprising a proximal push rod end connected to a pneumatically operated piston, the piston driving the push rod in a reciprocating motion, and
(b) a push rod tip extending from a distal push rod end and adapted to engage a distal end of a lever biased toward the annular gear such that a distal end of the lever is in contact with the annular gear.

8. A mechanism for cleaning an inner surface of a chamber, the mechanism comprising:
a chamber comprising a chamber wall comprising an interior surface;
an annular gear having mounted thereon at least one scraping blade within the chamber parallel to a longitudinal axis of said chamber; and
a push rod apparatus for rotating the annular gear, said push rod apparatus comprising a push rod having (i) a proximal push rod end connected to a pneumatically operated piston, said piston driving said push rod in a reciprocating motion, and (ii) a push rod tip extending from a distal push rod end and adapted to engage a proximal end of a lever biased toward the annular gear such that a distal end of said lever is in contact with said annular gear;
wherein rotation of said annular annular gear by said push rod apparatus causes circumferential rotation of said scraping blade around the interior of said chamber to scrape the interior surface of said chamber.

9. A mechanism for cleaning an inner surface of a chamber, said mechanism comprising:
at least one scraping blade rotatably mounted within a chamber parallel to a longitudinal axis of said chamber;
an annular gear assembly comprising an annular gear, said assembly supporting said scraping blade within said chamber; and
a push rod apparatus for rotating the annular gear, said push rod apparatus comprising a push rod having (i) a proximal push rod end connected to a pneumatically operated piston, said piston driving said push rod in a reciprocating motion, and (ii) a push rod tip extending from a distal push rod end and adapted to engage a proximal end of a lever biased toward the annular gear such that a distal end of said lever is in contact with said annular gear;

wherein rotation of said annular annular gear by said push rod apparatus causes circumferential rotation of said scraping blade around the interior of said chamber to scrape the interior surface of said chamber.

10. A mechanism for cleaning an inner surface of a chamber, the mechanism comprising:
(a) at least one scraping blade rotatably mounted within a chamber parallel to a longitudinal axis of the chamber;
(b) a toothed annular gear assembly comprising a housing, a toothed annular gear having a proximal face and a distal face, the annular gear being rotatably mounted within the housing between proximal and distal annular bearings, the housing further comprising proximal and distal face plates attached to the housing, the toothed annular gear supporting the at least one scraping blade within the chamber; and
(c) a push rod assembly adapted to engage said toothed annular gear for rotating said at least one scraping blade circumferentially at least 360° around the interior of said chamber to scrape the interior surface of said chamber.

11. A self-cleaning chamber mechanism comprising:
(a) a cylindrical chamber comprising:
(i) a chamber wall comprising an interior surface, and
(ii) at least one port positioned in a first end portion of the chamber and at least one port positioned in a second end portion of the chamber generally opposite to the first end portion of the chamber, wherein the ports are arranged to permit a longitudinal fluid flow path through said chamber;
(b) an annular mounting means for mounting at least one scraping blade within the chamber parallel to a longitudinal axis of the chamber, the annular mounting means comprising:
(i) a distal annular flange plate fastened to an annular housing;
(ii) a distal annular bearing disposed within the annular housing on the distal annular flange plate;
(iii) a toothed annular gear disposed within the annular housing on the distal annular bearing;
(iv) at least one scraping blade coupled to the annular gear;
(v) a proximal annular bearing disposed within the annular housing on the annular gear; and
(vi) a proximal annular flange plate fastened to the annular housing; and
(c) a rotating means for rotating the annular mounting means circumferentially and unidirectionally for at least 360° around the interior of the chamber to scrape the interior surface of the chamber.

12. The self-cleaning chamber mechanism of claim 11, wherein said rotating means comprises a lever biased towards the toothed annular gear mounted on the annular mounting means, such that a distal end of said lever is in contact with said annular gear.

13. The self-cleaning chamber mechanism of claim 12 wherein said rotating means further comprises:
(a) a pushrod having a proximal pushrod end connected to a pneumatically operated piston, the piston driving the pushrod in a reciprocating motion; and
(b) a pushrod tip extending from a distal pushrod end and adapted to hingedly engage a distal end of the lever.

14. The self-cleaning chamber mechanism of claim 12 wherein said lever is springloaded.

15. A self-cleaning chamber mechanism comprising:
(a) a cylindrical chamber comprising an interior surface;

(b) one or more scraping blades mounted longitudinally within the cylindrical chamber in contact with the interior surface of the cylindrical chamber;

(c) a toothed ring-shaped gear coupled to and supported by toothed ring-shaped gear; and (d) a ring-shaped mounting means to which the toothed ring-shaped gear is rotationally mounted;

(e) a means for engaging the toothed ring-shaped gear to unidirectionally rotate the gear, and to thereby rotate the scraping blade(s), about the interior circumference of the chamber to scrape the interior surface of the chamber.

* * * * *